United States Patent [19]

Crofoot

[11] Patent Number: 4,946,353

[45] Date of Patent: Aug. 7, 1990

[54] EXTERNAL STATOR ROLLING ROTOR SCROLL COMPRESSOR

[75] Inventor: James F. Crofoot, Kirkville, N.Y.

[73] Assignee: Carrier Corporation, Syracuse, N.Y.

[21] Appl. No.: 374,800

[22] Filed: Jul. 3, 1989

[51] Int. Cl.⁵ .............................................. F04C 18/02
[52] U.S. Cl. ................................... 417/410; 418/55.3; 418/55.5; 418/57
[58] Field of Search .............. 417/321, 410; 418/55 B, 418/55 D, 57

[56] References Cited

U.S. PATENT DOCUMENTS

| | | | |
|---|---|---|---|
| 2,561,890 | 7/1951 | Stoddard | 417/410 |
| 4,655,696 | 4/1987 | Utter | 418/55 B |
| 4,753,582 | 6/1988 | Morishita et al. | 418/55 D |
| 4,846,639 | 7/1989 | Morishita et al. | 418/55 D |

*Primary Examiner*—Leonard E. Smith
*Assistant Examiner*—David W. Scheuermann
*Attorney, Agent, or Firm*—David J. Zobkiw

[57] ABSTRACT

A hermetic scroll compressor is driven by a rolling rotor motor. The orbiting scroll and drive shaft are integral and orbit with respect to the rotor which carries the drive shaft as it moves about the stator bore.

5 Claims, 5 Drawing Sheets

ON AT OFF

ON BEFORE OFF

EXTERNAL STATOR ROLLING ROTOR SCROLL COMPRESSOR

BACKGROUND OF THE INVENTION

A rolling rotor motor is one in which only a portion of the windings are activated at any given time and the resultant asymmetric magnetic field is moved around the stator by changing which ones of the windings are the activated windings. This type of motor is characterized by high torque and low speed. Where the rotor is located internally of the stator, the coaction between the rotor and stator as a result of the asymmetric magnetic field, unless otherwise limited, is like that of the piston and cylinder of a rolling piston or reciprocating vane type compressor. As a result, the rotor may also be the piston of a rolling piston compressor such as is disclosed in U.S. Pat. No. 2,561,890. Since the rotor rolls around the stator, there are low bearing loads as compared to a motor in which the rotor is constrained to rotate about a fixed axis.

The rolling rotor motor can be integral with the compressor thereby reducing the size and number of parts such as shafts and bearings, but it has some inherent disadvantages. Because only some of the windings are activated at any particular time, the output torque per pound of motor weight is less than it would be for an induction motor. Also, the rotor is dynamically unbalanced since its center traces a circular orbit as it moves curcumferentially towards the activated windings due to magnetic attraction as it follows the rotating field. The unbalance forces increase with the square of the rotor speed thus making the motor unsuitable for high speed applicaions.

SUMMARY OF THE INVENTION

The rotor of an external stator rolling rotor motor has an axial bore which is concentric with the axis of the rotor. A drive shaft is located in the bore and is supported by two anti-friction bearings such that the drive shaft can rotate within the bore. The drive shaft is integral with the orbiting scroll of a scroll compressor. The orbital motion of the rotor is transferred to the drive shaft and the orbiting scroll. The rolling motion of the rotor is weakly transmitted to the orbiting scroll through the anti-friction bearings such that a small pin is adequate to prevent the orbital scroll from rotating.

It is an object of this invention to drive a scroll compressor with a rolling rotor motor.

It is a further object of this invention to provide an external stator rolling rotor motor driven scroll compressor. These objects, and others as will become apparent hereinafter, are accomplished by the present invention.

Basically, the rotor of an external stator rolling motor carries a drive shaft and orbiting scroll through its orbiting movement. Rotary movement is transmitted through anti-friction bearings so that the orbiting scroll is readily held to an orbiting movement through a small pin or the like.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
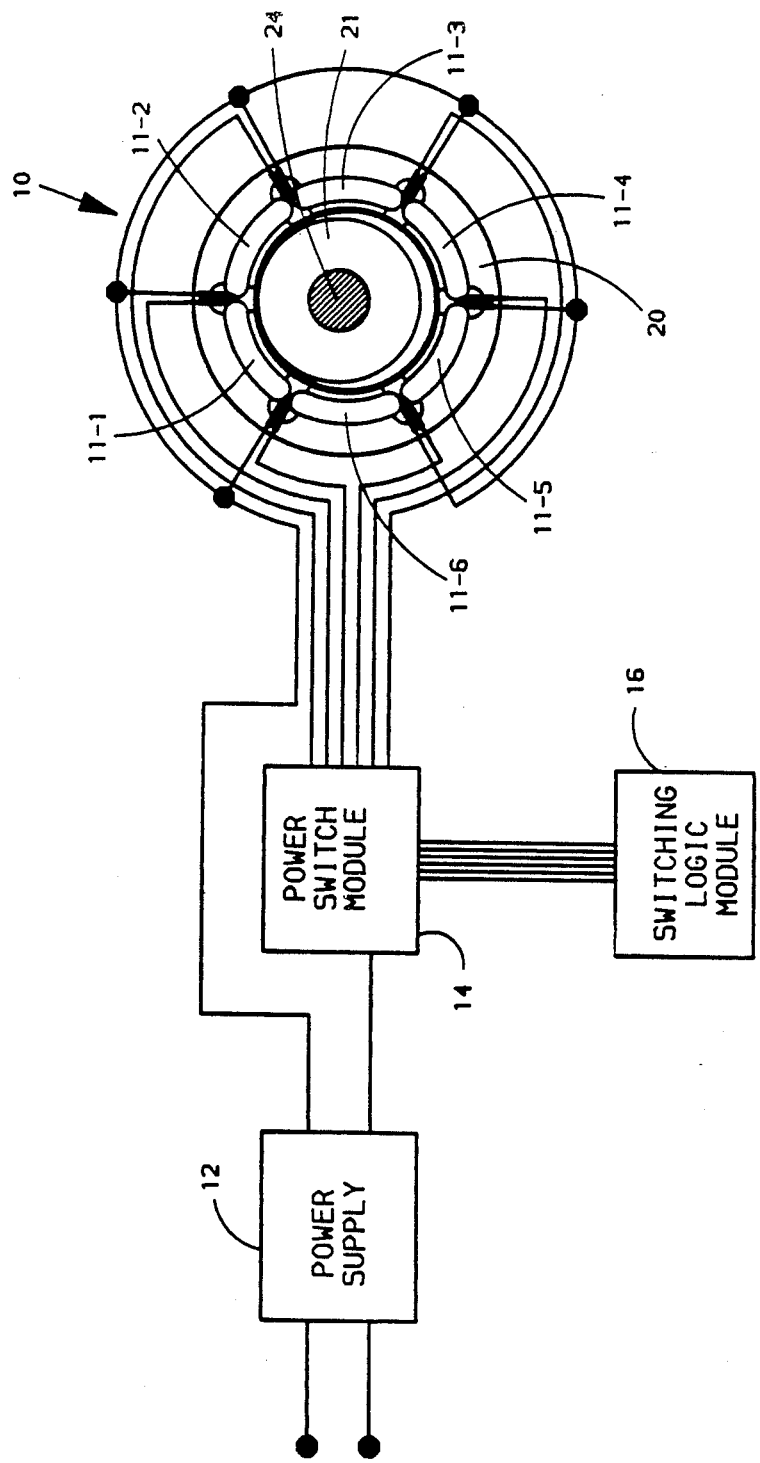
FIG. 1 is a circuit diagram for a rolling rotor motor/compressor.
Figure 2:
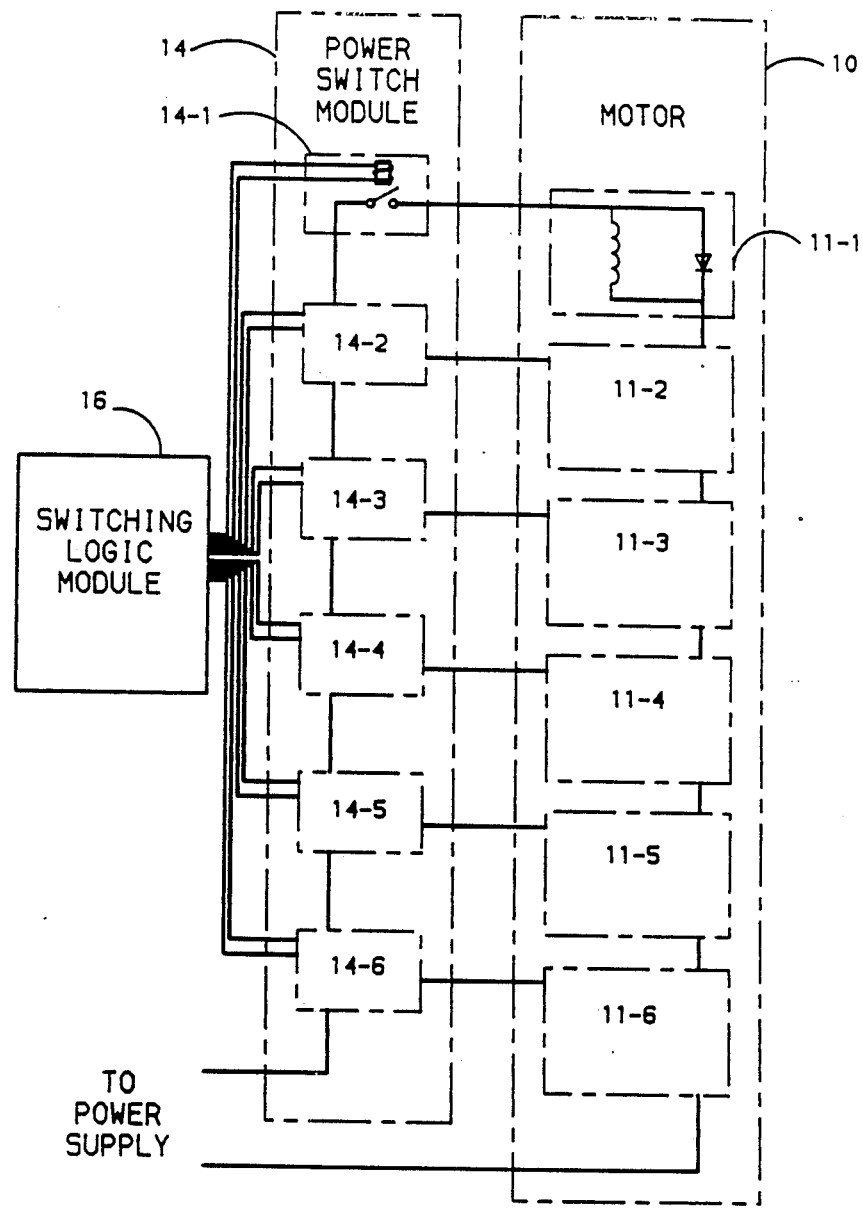
FIG. 2 is a more detailed view of the switching portion of the circuit of FIG. 1.
Figure 3:
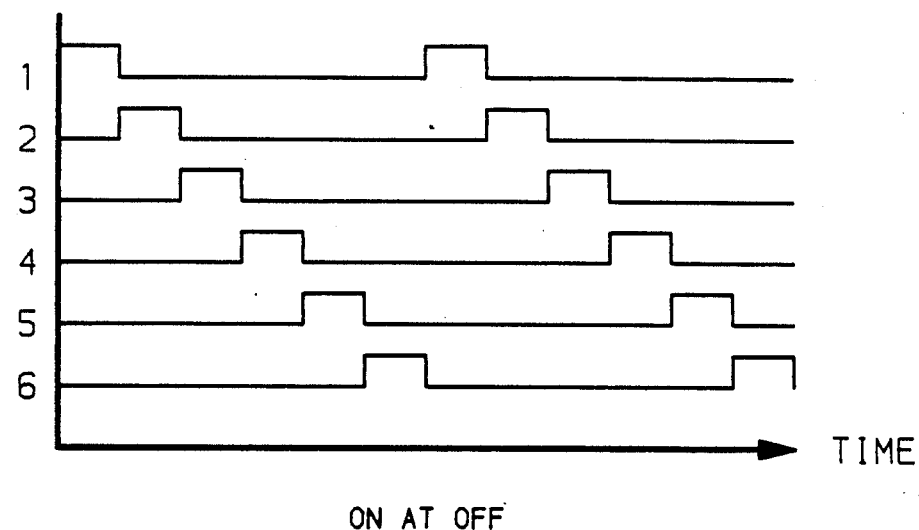
FIG. 3 is a graph showing the actuation of the switches as a function of time in the on at off mode.
Figure 4:
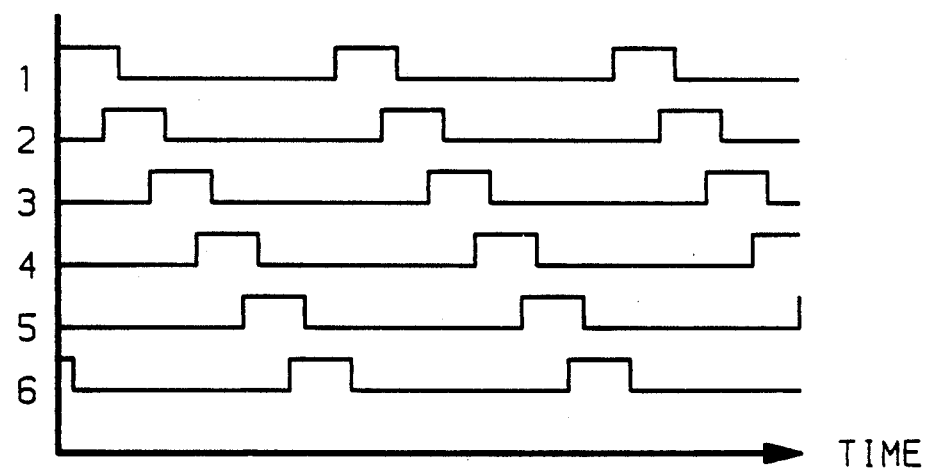
FIG. 4 is a graph showing the actuation of the switches as a function of time in the on before off mode.

In FIG. 1 the numeral 10 generally designates a rolling rotor motor driven scroll compressor which has a plurality of windings with six, 11-1 to 6, being illustrated. Power from power supply 12 is supplied to windings 11-1 to 6 by power switch module 14 under the control of switching logic module 16. Referring to FIG. 2, it will be noted that the power supply 12 is connected to windings 11-1 to 6 through switches 14-1 to 6 which are controlled by switching logic module 16. Switch 14-1 is illustrated as solenoid actuated but any suitable power switching may be employed. Switches 14-1 to 6, as illustrated in FIG. 3, can be actuated in an "on at off" mode wherein the shutting off of power to one winding coincides with the supplying of power to the next winding. Alternatively, as illustrated in FIG. 4, switches 14-1 to 6 can be actuated in an "on before off" mode wherein power is supplied to a winding for a short period of time after power is supplied to the next winding.

Figure 6:
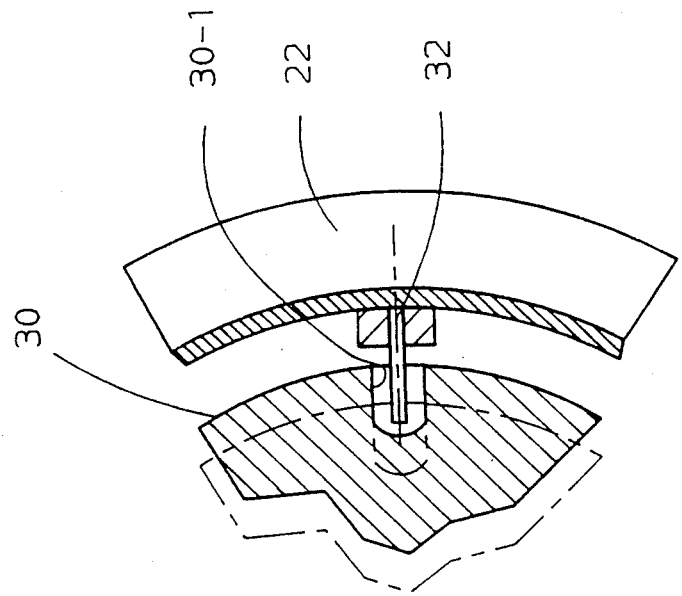
FIG. 6 is a section taken along line 6—6 of FIG. 5.
Figure 5:
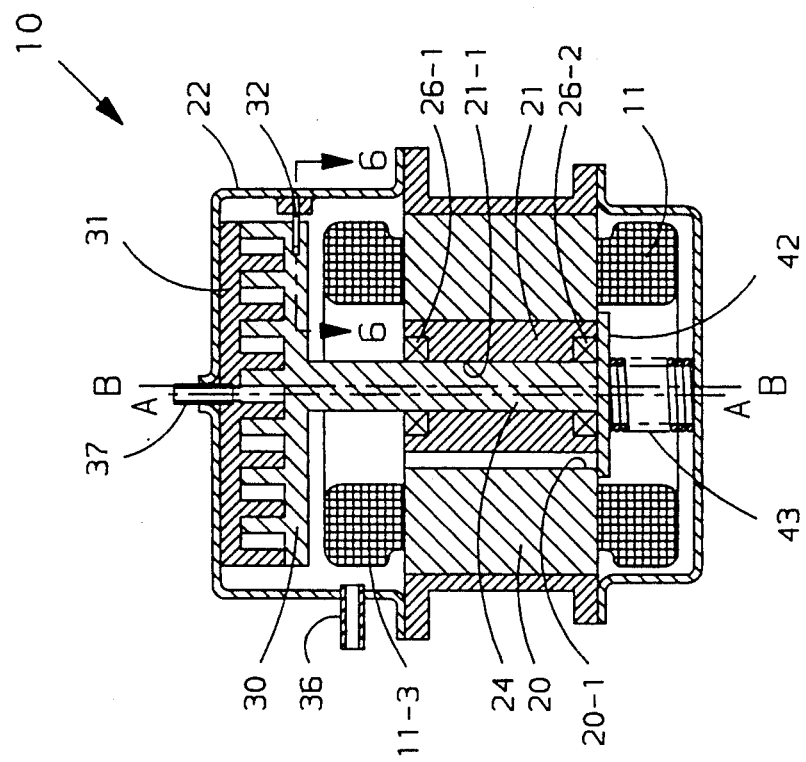
FIG. 5 is a vertical section of an external stator rolling rotor motor driven scroll compressor.

Referring now to FIG. 5, rolling rotor motor driven hermetic scroll compressor 10 is a low side compressor which is one in which all or most of the interior of hermetic shell 22 is at suction pressure compressor 10 includes a stator 20 with windings 11 and a rotor 21 having an axial bore 21-1. Drive shaft 24 is located and supported in axial bore 21-1 by anti-friction bearings 26-1 and 2 so as to be readily rotatable with respect to rotor 21. Anti-friction bearings 26-1 and 2 may be made as roller bearings defining frustoconical support surfaces to thereby provide thrust bearing surfaces for corresponding surfaces on drive shaft 24. Orbiting scroll 30 is integral with drive shaft 24 but may be either the same piece or assembled to the drive shaft 24 so as to be integral therewith. Orbiting scroll 30 coacts with fixed scroll 31 which is suitably secured to hermetic shell 22 as is stator 20. As best shown in FIG. 6, a slot 30-1 is formed in orbiting scroll 30 and receives pin 32 which is suitably secured to the interior of hermetic shell 22. Spring 43 biases thrust plate 42 against the bottom of stator 20 so that plate 42 acts as a thrust bearing for drive shaft 24 during operation while preventing excess axial movement of rotor 21 and drive shaft 24 when the motor is not activated.

In operation, as the magnetic field moves about the stator 20 through the selective activation of some of the windings, as described above, rotor 21 tends to follow the magnetic field and coacts with the stator 20 in the manner of the coaction of the piston and cylinder of a rolling piston compressor. The rotor 21 thus rolls about the surface of rotor bore 20-1 and rotates about its axis B—B while axis B—B rotates about the axis A—A of rotor bore 20-1 carrying drive shaft 24 through anti-friction bearings 26-1 and 2. Because bearings 26-1 and 2 do not provide a driving connection, pin 32 coacting with slot 30-1 can hold orbiting scroll 30 and integral drive shaft 24 to an orbiting motion whereby axis B—B which is also the axis of drive shaft 24 orbits about axis A—A. Referring now to FIG. 6, an alternative position of orbiting scroll 30 is shown in phantom. It should be noted that orbiting scroll 30 can also move up and down, relative to the illustration of both FIGS. 5 and 6, before pin 32 limits further movement. This movement illustrated in FIG. 6, when applied to FIG. 5, takes place in the plane of line 6—6 of FIG. 5 while axial movement of orbiting scroll 30 with respect to pin 32 can also take place. Thus, there is sufficient motion available to override a liquid slug, grit, etc.

If a liquid slug, grit, etc. is encountered, the resulting axial force generated will overcome the motor centering force and move drive shaft 24 and rotor 21 downwardly against the thrust surface of thrust plate 42. The thrust surface provided between bearings 26-1 and 2 and drive shaft 24 are preferably located such that thrust support is supplied to drive shaft 24 by bearings 26-1 and 2 and thrust plate 42 during normal operation. Also, if sufficient axial forces are generated, thrust plate 42 can be moved against the bias of spring 43.

For compressor operation, refrigerant at suction pressure is supplied from the refrigeration system (not illustrated) via line 36 and refrigerant at discharge pressure is supplied to the refrigeration system (not illustrated) via line 37 in the conventional manner for a scroll compressor.

Figure 7:
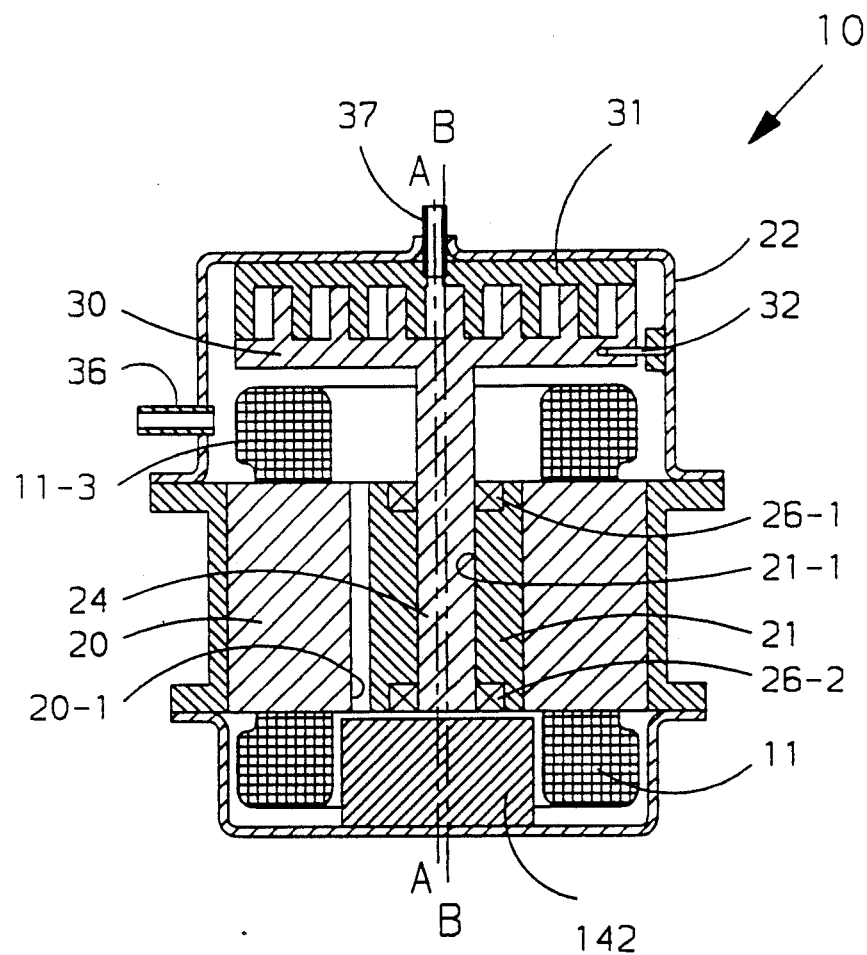
FIG. 7 is a vertical section of a modified external stator rolling rotor motor driven scroll compressor.

FIG. 7 illustrates a modified rolling rotor motor driven hermetic scroll compressor 100. Compressor 100 is the same as compressor 10 except that thrust plate 42 and spring 43 have been replaced by block 142 which serves the same function. Also, bearings 26-1 and 2 must supply a thrust surface as discussed above since block 142 is not moveable and is thus unable to track the movement of drive shaft 24 as can thrust plate 42, at least to a limited degree. When powered, coils 11 will tend to center any axial offset of rotor 21. The thrust surface of thrust block 142 should be situated such that when rotor 21 is at rest, it is slightly axially offset downwardly. When the motor is energized, rotor 21 will be pulled upwardly from thrust block 142 carrying drive shaft 24 and orbiting scroll 30 which will operatively engage fixed scroll 31. The offset is small but it is sufficient to space rotor 21 from thrust block 142 during normal operation. The only difference in operation would be that the additional axial movement due to the overcoming of the bias of spring 43 would no longer be available.

Although preferred embodiments of the present invention have been illustrated and described, other changes will occur to those skilled in the art. It is therefore intended that the scope of the present invention is to be limited only by the scope of the appended claims.

What is claimed is:

1. A scroll compressor means comprising:
   hermetic shell means;
   a rolling rotor motor means within said shell means and including a stator and a rotor with said stator and said rotor each having an axial bore and with said rotor being located within said bore of said stator;
   drive shaft means supported in said bore of said rotor by bearing means whereby relative rotary motion between said drive shaft means and said rotor can take place;
   fixed scroll means fixedly secured within said shell means; and
   orbiting scroll means integral with said drive shaft means so as to be movable therewith and coacting with said fixed scroll means for compressing gas.

2. The scroll compressor means of claim 1 further including thrust bearing means for supporting said drive shaft means and said orbiting scroll means.

3. The scroll compressor means of claim 1 further including anti-rotation means including a generally radially extending pin secured to the interior of said shell means which coacts with a radial recess in said orbiting scroll means.

4. The scroll compressor means of claim 1 wherein said bearing means also provide thrust support for said drive shaft means.

5. A low side hermetic scroll compressor means comprising:
   hermetic shell means having an inlet and an outlet extending therethrough;
   a rolling rotor motor means within said shell means and including a stator and a rotor with said stator and said rotor each having an axial bore and with said rotor being located within said bore of said stator;
   drive shaft means supported in said bore of said rotor by anti-friction bearing means whereby relative rotary motion between said drive shaft means and said rotor can take place;
   fixed scroll means fixedly secured within said shell means;
   orbiting scroll means integral with said drive shaft means so as to be movable therewith and coacting with said fixed scroll means for compressing gas;
   means for axially securing said rotor with respect to said stator and including thrust bearing means for supporting said drive shaft means and said orbiting scroll means;
   a generally radially extending pin secured to the interior of said shell means; and
   a radial recess formed in said orbiting scroll and coacting with said pin to define anti-rotation means whereby said orbiting scroll is prevented from rotating.

* * * * *